(12) United States Patent
Davis et al.

(10) Patent No.: US 8,567,120 B2
(45) Date of Patent: Oct. 29, 2013

(54) MODULAR PLANT SUPPORT STRUCTURE

(75) Inventors: Chris D. Davis, Riverton, UT (US); Geoffrey E. Dobbin, West Valley City, UT (US)

(73) Assignee: Chris D. Davis, Riverton, UT (US)

(*) Notice: Subject to any disclaimer, the term of this patent is extended or adjusted under 35 U.S.C. 154(b) by 282 days.

(21) Appl. No.: 13/022,430

(22) Filed: Feb. 7, 2011

(65) Prior Publication Data

US 2011/0232176 A1 Sep. 29, 2011

Related U.S. Application Data

(60) Provisional application No. 61/317,127, filed on Mar. 24, 2010.

(51) Int. Cl.
*A01G 17/04* (2006.01)

(52) U.S. Cl.
USPC ............................................................ 47/44

(58) Field of Classification Search
USPC ............................................ 47/44, 45, 47, 70
See application file for complete search history.

(56) References Cited

U.S. PATENT DOCUMENTS

| | | | | |
|---|---|---|---|---|
| 425,745 A * | 4/1890 | Brown | | 47/47 |
| 597,841 A * | 1/1898 | Dolf | | 47/47 |
| 1,560,404 A | 11/1925 | Brown | | |
| 1,942,975 A * | 1/1934 | Polgar | | 47/47 |
| 2,138,188 A * | 11/1938 | Morley | | 47/29.2 |
| 2,406,439 A * | 8/1946 | Pratt, Sr. | | 47/79 |
| 2,763,096 A * | 9/1956 | Roger | | 47/45 |
| 3,076,289 A * | 2/1963 | Gallo | | 47/83 |
| 3,704,545 A * | 12/1972 | Van Reisen | | 47/69 |
| 4,026,068 A | 5/1977 | Tepper | | |
| 4,561,208 A * | 12/1985 | Schultz | | 47/83 |
| 4,841,670 A * | 6/1989 | Bitter | | 47/47 |
| 4,962,614 A | 10/1990 | Koerper | | |
| 5,640,802 A * | 6/1997 | Elliott | | 47/45 |
| 5,913,728 A * | 6/1999 | Bal et al. | | 47/45 |
| 6,088,956 A | 7/2000 | Rocka | | |
| 6,349,502 B1 | 2/2002 | Fernandez | | |
| 7,478,501 B2 | 1/2009 | Wilbanks, Jr. et al. | | |
| 7,966,768 B2 * | 6/2011 | Dipaolo et al. | | 47/70 |
| 7,984,585 B1 * | 7/2011 | Wu | | 47/58.1 R |
| 2008/0028677 A1 * | 2/2008 | Shelton | | 47/46 |
| 2008/0313960 A1 * | 12/2008 | Norvitch | | 47/79 |
| 2010/0325950 A1 * | 12/2010 | Kassouni | | 47/45 |
| 2011/0232176 A1 * | 9/2011 | Davis et al. | | 47/44 |

FOREIGN PATENT DOCUMENTS

| | | | | |
|---|---|---|---|---|
| DE | 3400838 A1 * | 7/1985 | | A01G 9/12 |
| EP | 89291 A1 * | 9/1983 | | A01G 9/12 |

* cited by examiner

*Primary Examiner* — Frank T Palo
(74) *Attorney, Agent, or Firm* — Geoffrey E. Dobbin; Dobbin IP Law P.C.

(57) ABSTRACT

The present invention is a modular support for vine plants and tomato plants. It comprises a solid, cylindrical base with holes to accept posts and associate tier rings. A cover may also be provided to transform the base into a miniature hot house. Notches may be formed in the rim of the base to accommodate irrigation systems and stake ends may be provided for the posts to allow immediate securement of the posts to the ground rather than the base. The solid base contains water, mulch and other beneficial compounds for the plants and helps block the spread of weeds immediately around the plant. As the plant grows, additional tiers may be added to the support to increase its size. The parts are preferably made of a durable plastic so as to support larger plants and increase longevity of the support.

7 Claims, 5 Drawing Sheets

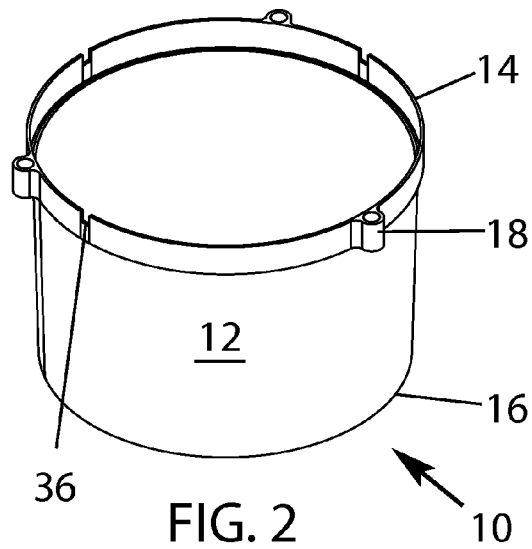
FIG. 2
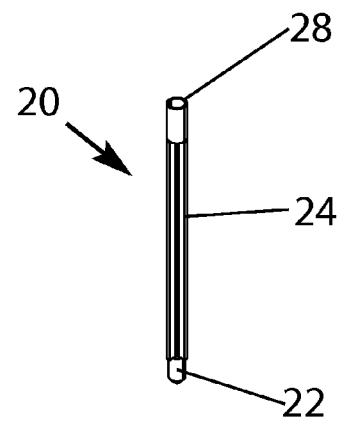
FIG. 3
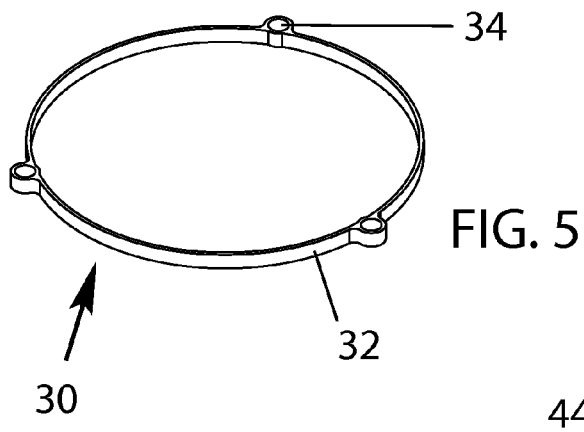
FIG. 5
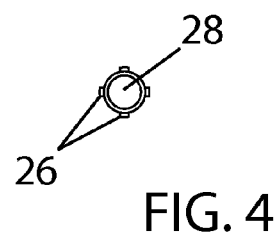
FIG. 4
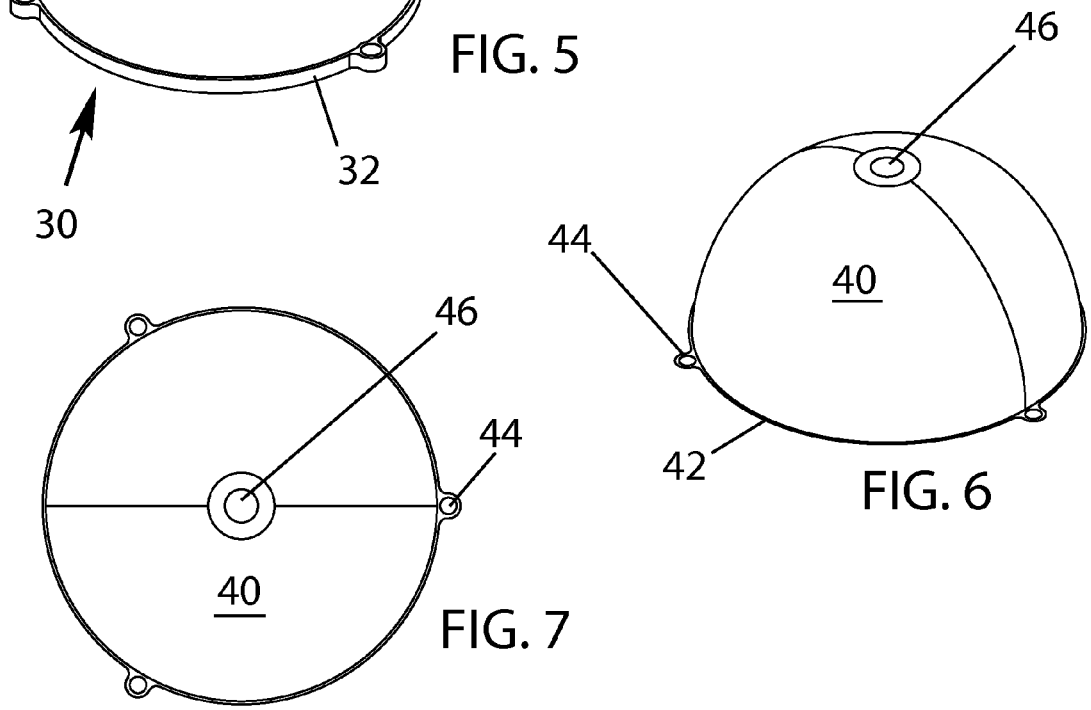
FIG. 6
FIG. 7

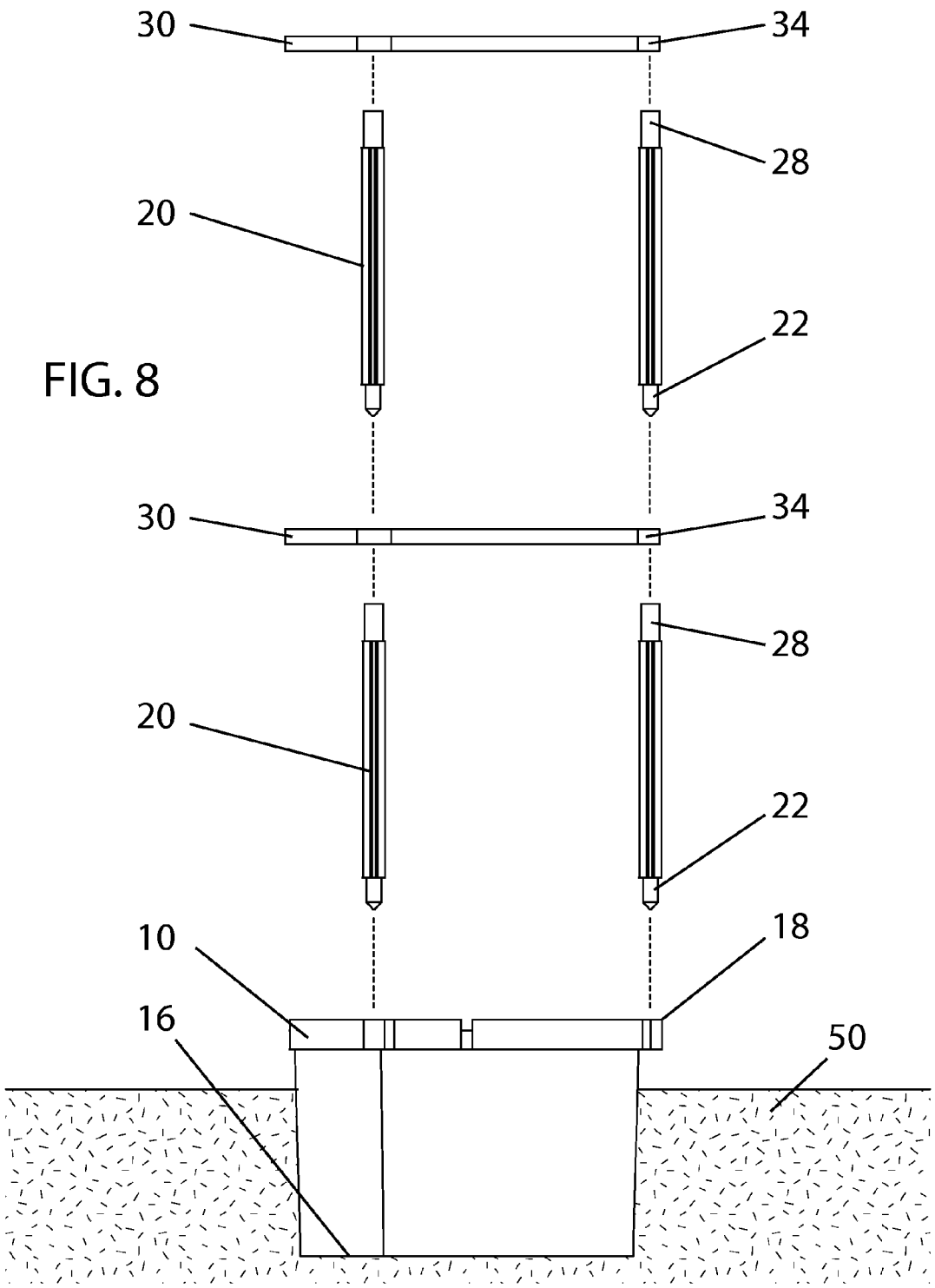

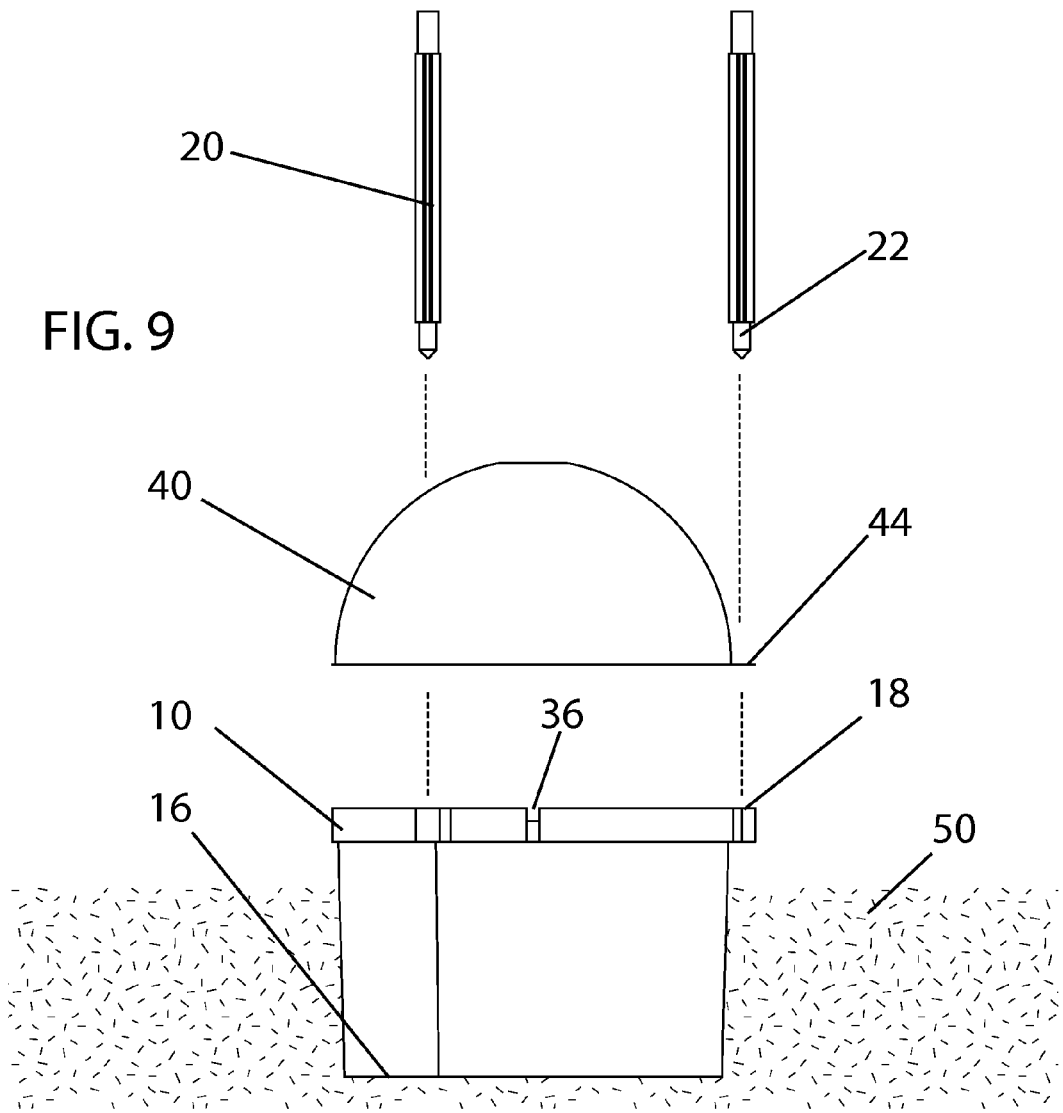

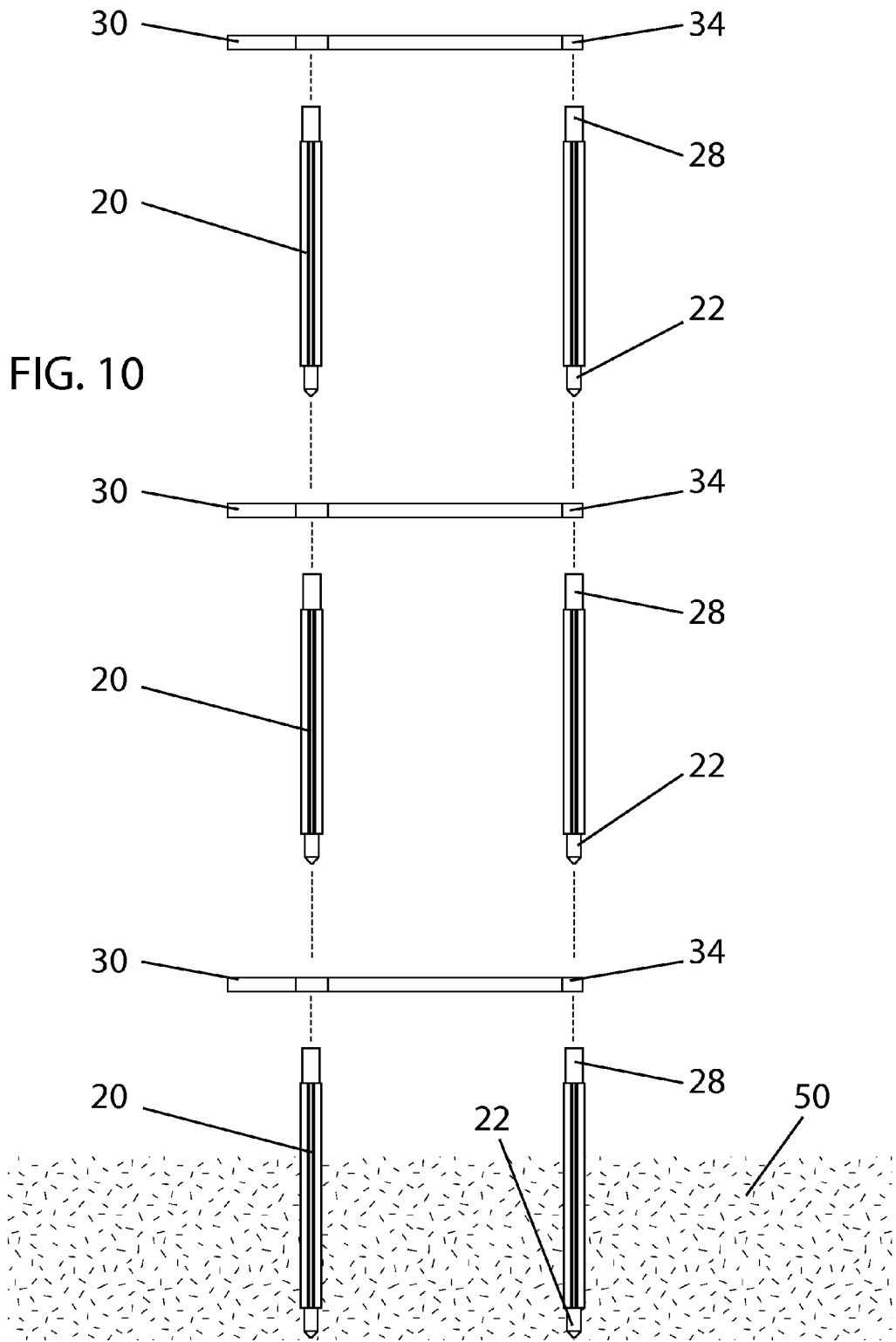

MODULAR PLANT SUPPORT STRUCTURE

CROSS-REFERENCES TO RELATED APPLICATIONS

This Application claims priority as a non-provisional perfection of prior filed U.S. Provisional Application No. 61/317,127, filed Mar. 24, 2010, and incorporates the same by reference herein in its entirety.

FIELD OF THE INVENTION

The present invention relates to the field of agriculture and gardening and more particularly relates to a plant support, often termed a "cage," used to grow tomato plants and vine vegetable and fruit plants such as cucumbers, melons and gourds.

BACKGROUND OF THE INVENTION

Gardening is not only a hobby for some individuals; it is a way of life that has existed for thousands of years. The growth of fruit and vegetable plants for personal use can be rewarding both recreationally and financially. Each type of plant has its own particular growth requirements, from soil and water conditions to amount of sun and type of fertilizer. One requirement for many plants is the use of a support structure to keep the plant from spreading over the ground and limiting the space for other plants. Supports also keep fruits and vegetables from growing directly on the ground, which would decrease their quality. Tomatoes are known to benefit from such supports, as do vine fruit plants that produce cucumbers, gourds and melons and vine vegetable plants that produce beans and peas.

The common practice for tomatoes is to surround the plant when it is still small with a structure called a "tomato cage." This cage is usually a conical wire frame that is secured in the ground and is available for the tomato plant to wrap around it while the plant grows. In so doing, the tomato plant essentially grasps the cage and uses it as a framework, keeping the plant off the ground.

Tomato cages do have their own difficulties, though. These tomato cages tend to be usable for a couple of seasons, but the weight of the plants does tend to warp them and the elements do tend to corrode the cage. They also tend to break with little applied force, particularly when separating the plant from the cage at the end of the season. The wire construction tends to be suitable for tomatoes and other small fruited plants, such as peas and beans, but larger fruit plants, such as melons and gourds tend to be too heavy for the wire construction of tomato cages. As such, different types of supports are necessary for different plants—and even different sizes of tomato cages must be produced for larger or smaller tomato plants. The tomato cages also suffer from being top heavy, as they are poorly supported in the ground (especially is the ground is shallow) until the plant grows large enough to help anchor the cage. What is needed then, is a more stable support structure that is durable and easily removed from the plant at the end of the season.

The present invention represents a departure from the prior art in that the vegetable support of the present invention allows for sturdy, modular construction that allows the support to be build upon as the supported plant grows while providing a solid and sturdy base that not only anchors the support without the plant, but also surrounds the plant with a wall to reduce weeds and facilitate individual mulching and watering of plants. Auxiliary structures also allow for capping the support in a manner to create a miniature hot house or shield from frost. The support may also be converted into a more traditional cage structure should a user so desire.

SUMMARY OF THE INVENTION

In view of the foregoing disadvantages inherent in the known types of plant supports, the present invention's general purpose is to provide a new and improved modular plant support that is well anchored on the ground, sturdy and sufficient to support even large fruits grown on supported plants, modular for varying size with the size of the supported plant, and solid for containment of much, fertilizers, and water.

To accomplish these objectives, the modular plant support comprises a cylindrical base, ideally circular, with a plurality of post holes situated along a top rim of the cylinder. The support also comprises a plurality of posts insertable within the post holes and at least one ring, again with post holes to both accept the posts inserted along the rim, but also to allow for additional posts to allow for higher tiers of rings. The cylinder is generally a solid construction, thus encircling the targeted plant as a wall so as to contain mulch and water for the benefit of the plant. Additional posts and stake ends may be used to support the rings directly on stakes placed in the ground. A transparent top shell may also be fitted on the rim of the cylinder to not only create a hot house for optimum growing conditions, but also protect young plants from late frost. Notches and clips may be placed in and on the rim to facilitate the use of irrigation drip systems commonly used in the market today.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a perspective view of the base for the support for FIG. 1.

FIG. 3 is a perspective view of a post used in the support of FIG. 1.

FIG. 4 is a top plan view of the post of FIG. 3.

FIG. 5 is a perspective view of a ring used in the support of FIG. 1

FIG. 6 is a perspective view of a cover used in conjunction with the base of FIG. 5.

FIG. 7 is a top plan view of the cover of FIG. 6.

FIG. 8 is an exploded view of a support according to the present invention, using two tiers.

FIG. 9 is an exploded view of a support according to the present invention, utilizing the base of FIG. 2 used with a cover of FIG. 6.

FIG. 10 is an exploded view of a support according to the present invention, eschewing the base of FIG. 2.

DETAILED DESCRIPTION OF THE PREFERRED EMBODIMENT

Figure 1:
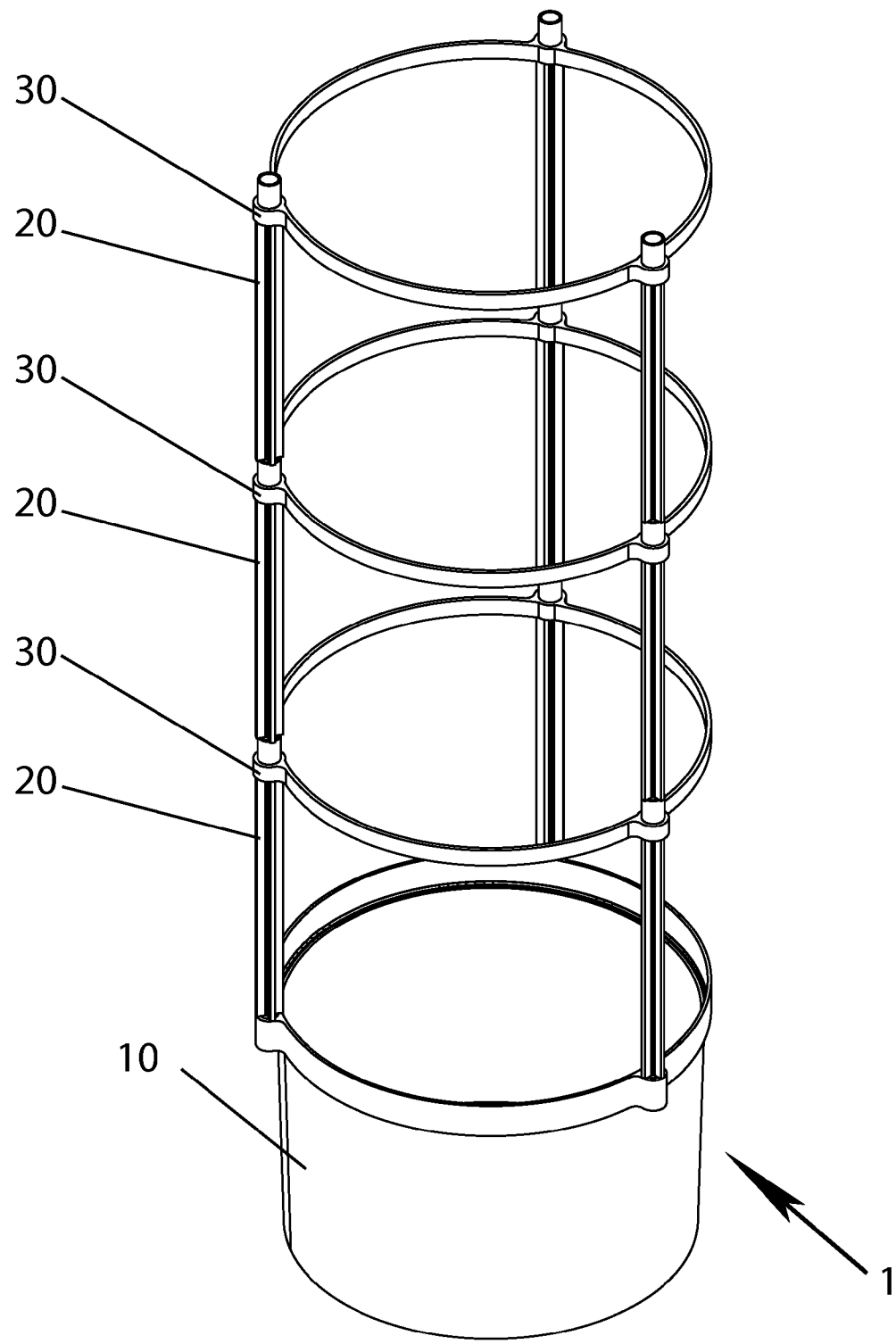
FIG. 1 is a perspective view of a modular plant support according to the present invention.

With reference now to the drawings, the preferred embodiment of the modular plant support is herein described. It should be noted that the articles "a", "an", and "the", as used in this specification, include plural referents unless the content clearly dictates otherwise.

With reference to FIG. 1, the plant support 1 features a modular design with a cylindrical base 10, a plurality of posts 20 and at least one tier ring 30. As can be seen in FIGS. 8-10, these parts are mutually removable. The cylindrical base 10, as shown in FIG. 2, features a solid wall 12 with an upper rim 14 and a lower rim 16. Along the upper rim 14 are a plurality of sockets 18 in which posts 20 may be inserted. The wall 12 is preferably angled so that a plurality of bases may be stacked within each other for off-seasonal storage. Ideally, the upper rim 14 features a plurality of notches 36. These notches 36 may be used to provide ventilation when cover 40 is installed or to allow for and direct drip irrigation hosing systems around the plant. The drip irrigation hoses may be clipped on the rim 14, in the notches 44, or may pass through the structure, depending upon the preference of the user and the design of the system. The notches 36 may be omitted from the design of the cylindrical base without departing from the purview of the invention.

Each post 20, shown in FIGS. 3 and 4, comprises an elongate body 24 with two ends. The first end terminates in a spur 22 which is insertable within the sockets 18 of the base 10. The second end 26 features another socket 28, into which a spur 22 will also fit. Along the body 24 are a plurality of spines 26 that extend radially from the body 24 of the post 20.

Each tier ring 30, shown in FIG. 5, has a ring body 32 with a plurality if interfaces 34. Each interface is essentially a hole which will fit around the socket end 28 of each post 20. While able to slide over the socket 28, the rim of the interface will rest upon the post's spines 26. As such, each tier ring 30 is then supported by the posts 20 and secured in position by an additional set of posts 20 supporting a higher tier ring 30 or, if it is the top tier, it may be secured by a plurality of caps or another set of posts, much as shown with the transparent dome in FIG. 9. It should be noted that the fit between the posts 20 and the tier rings 30 may be made to be so exact+that a top cap or additional set of posts may be unnecessary to secure the top tier ring. With this construction, shown in FIGS. 1 and 8, the base 10 is first secured in the ground about a young plant by burying the lower rim 16 in the soil 50 and then planting the plant. As the plant grows, a series of posts 20 and a tier ring 30 are added to the support. In this manner, the support 1 is never so top heavy as to topple on its own weight or with the elements and only as much of each support 1 that is needed is used.

The solid base 10 presents other advantages as well as the modular support structure 1. First, it contains the area around the plant, making watering and mulching more effective. Second, it also blocks weeds' root systems from invading the area around the plant. Thirdly, it may be used in conjunction with a modular transparent dome 40, shown in FIGS. 6 and 7, to create an individual hot house to protect young plants from the elements, like a late frost, and increase the ambient temperature for the plant. The cover 40 is made to interface with the base 10 with a plurality of tabs 42 through which posts 20 may be inserted into the base's sockets 18, FIG. 9.

It should be noted that the posts 20 do have spurs 22 which may be directly inserted into the ground, as shown in FIG. 10. Such a strategy may be desirable if the plant has previously been planted and the user does not want to dig the entire plant out of the ground and re-plant it. Such a scenario is readily conceivable in the event a prior art support failed. While not as secure as the preferred embodiment, and not featuring the containment advantages of the base, the support is more secure, sturdy and features the benefit of modular construction to follow the growth of the plant.

Ideally, the components should be molded from a sturdy and durable plastic. The preferred shape is generally round, or in the case of the base a round cylinder; however, other shapes, such as a square, triangle, or other polygonal shape may be utilized without departing from the spirit and scope of the invention. Likewise, the preferred number of posts used for each tier is three; but, different numbers may be utilized for different shapes of support (i.e. four for a square, five for a pentagon, etc.).

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A modular plant support comprising:
   a. A cylindrical base, further comprising:
      i. A base wall;
      ii. A lower rim; and
      iii. An upper rim, said upper rim still further comprising a plurality of sockets;
   b. A plurality of posts, insertable within the sockets of the base on one end and likewise having sockets on an end opposite and further comprising a plurality of radial spines; and
   c. At least one tier ring, having a plurality of interfaces, each interface capable of sliding around one of the sockets of the posts and causing the tier ring to rest on the spines of the posts.

2. The modular plant support of claim 1, further comprising a cover, attachable to the sockets of the base.

3. The modular plant support of claim 2, the cover being made of a material to allow solar energy to pass therethrough.

4. The modular plant support of claim 3, the base further comprising at least one notch in the upper rim.

5. The modular plant support of claim 1, further comprising at least one notch in the upper rim.

6. The modular plant support of claim 1, the ends on the posts insertable within the sockets of the base and posts being spiked.

7. A plant support comprising:
   a. A plurality of posts, each post having a socket on one end and a spike on an end opposite and further comprising a plurality of radial spines; and b. At least one tier ring, having a plurality of interfaces, each interface capable of sliding around a socket of one of the posts and causing the tier ring to rest on the spines of the posts such that when an upper post's spike is inserted into a lower post's socket, the at least one tier ring is secured between the spines of the upper and lower posts.

\* \* \* \* \*